United States Patent [19]
Akatsu

[11] Patent Number: 5,914,800
[45] Date of Patent: Jun. 22, 1999

[54] OPTICAL SCANNING SYSTEM

[75] Inventor: Kazuhiro Akatsu, Ibaraki, Japan

[73] Assignee: Hitachi Koki Co., Ltd., Tokyo, Japan

[21] Appl. No.: 08/839,751

[22] Filed: Apr. 15, 1997

[30] Foreign Application Priority Data

Apr. 15, 1996 [JP] Japan .................................. 8-92126

[51] Int. Cl.$^6$ .................................................. G02B 26/08
[52] U.S. Cl. ........................ 359/206; 359/204; 359/205; 359/207; 359/216
[58] Field of Search .................................. 359/205, 206, 359/207, 216–219, 662; 347/137, 243, 244

[56] References Cited

U.S. PATENT DOCUMENTS

5,245,462   9/1993   Kanai et al. ............................ 359/206
5,251,055  10/1993   Koide ..................................... 359/206

*Primary Examiner*—James Phan
*Attorney, Agent, or Firm*—Sughrue, Mion, Zinn, Macpeak & Seas, PLLC

[57] ABSTRACT

A predetermined relationship has been found between a number of beams and a ratio a between magnifications in an sub scanning direction. During scanning with a small number of beams, the allowable range of magnification ratio becomes comparatively large. During scanning with a large number of beams, the allowable range of magnification ratio is around 1. By setting the magnification ratio a in the sub scanning direction so as to satisfy the aforementioned allowable ranges, printing with less pitch error can be implemented even with a small magnification.

2 Claims, 8 Drawing Sheets

OPTICAL SCANNING SYSTEM

BACKGROUND OF THE INVENTION

1. Field of the Invention

The invention relates to optical scanning systems used for laser beam printers, copying machines, and the like. More particularly, the invention is directed to an optical system that scans with a plurality of beams and that has an Fθ lens system consisting of a plurality of lenses including at least a single cylinder lens.

2. Description of the Related Art

Figure 1:
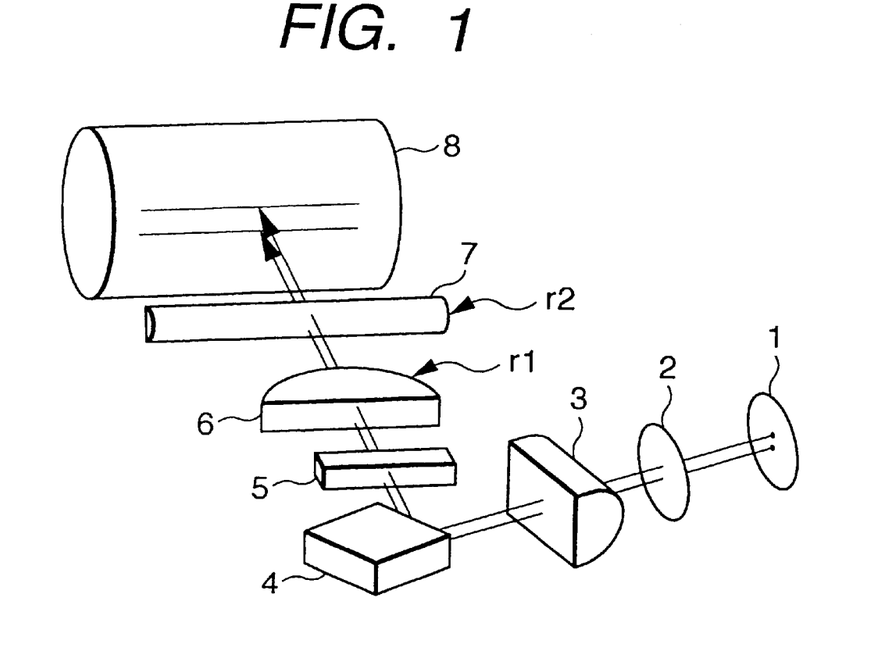
FIG. 1 is a diagram showing a general configuration of an embodiment of the invention.
Figure 2:
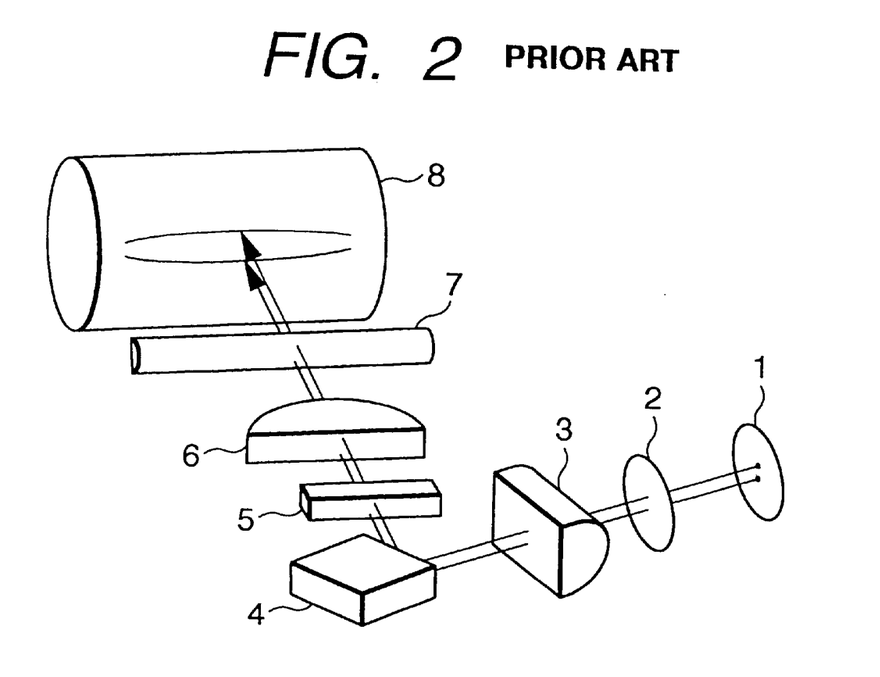
FIG. 2 is a diagram showing a general configuration of a conventional example.

An example of a conventional laser beam printer having an Fθ lens system that consists of a plurality of lenses including at least a single cylinder lens is shown in FIG. 2. In the conventional example, a light source 1 is constructed of a semiconductor laser or the like. Light injected from such light source 1 passes through a collimator lens 2, passes through a cylinder lens 3 that is inserted so that a beam of light can be injected onto a rotary polygon mirror 4 surface correctly, and is condensed by the rotary polygon mirror 4 only in an sub scanning direction. The constricted beam of light is thereafter deflected and scanned by the rotary polygon mirror 4, passes through Fθ lens system lenses 5, 6, 7 and forms an image on a photoreceptor 8. It may be noted that the lens 5 is a spherical lens and the lens 6 is a aspherical lens, each of these lenses having different radii of curvature in the sub scanning direction at the central region and at the peripheral region, and that the lens 7 is a cylinder lens.

Figure 3:
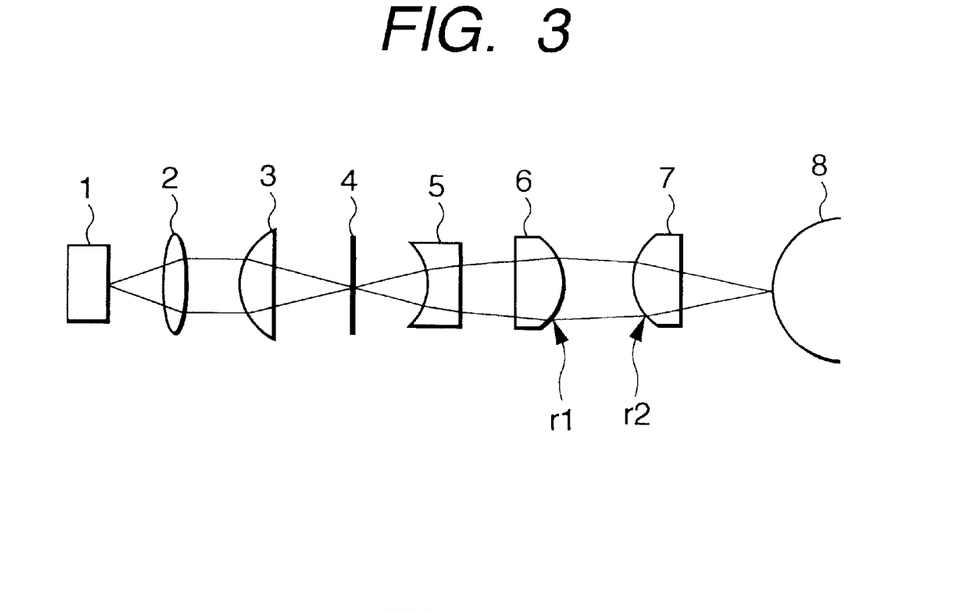
FIG. 3 is a horizontal sectional view of an optical path of a multi-beam scanning optical system.
Figure 4:
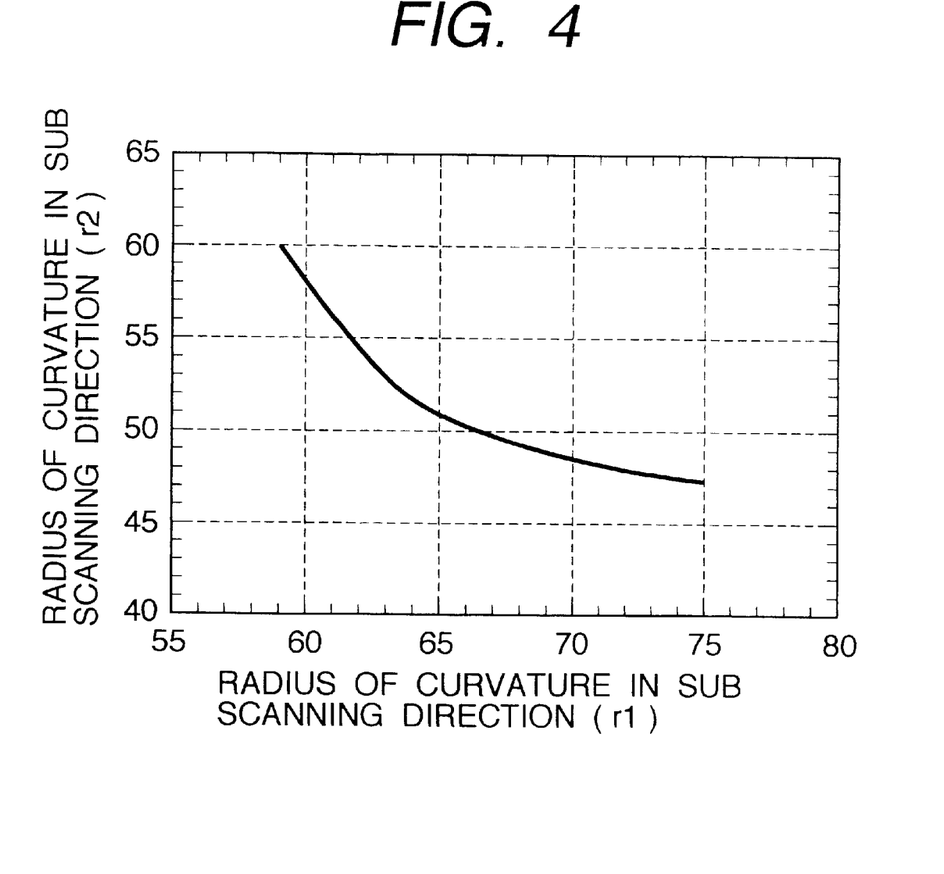
FIG. 4 is a diagram illustrative of a relationship between a radius of curvature r1 in an sub scanning direction and a radius of curvature r2 in the sub scanning direction.
Figure 5:
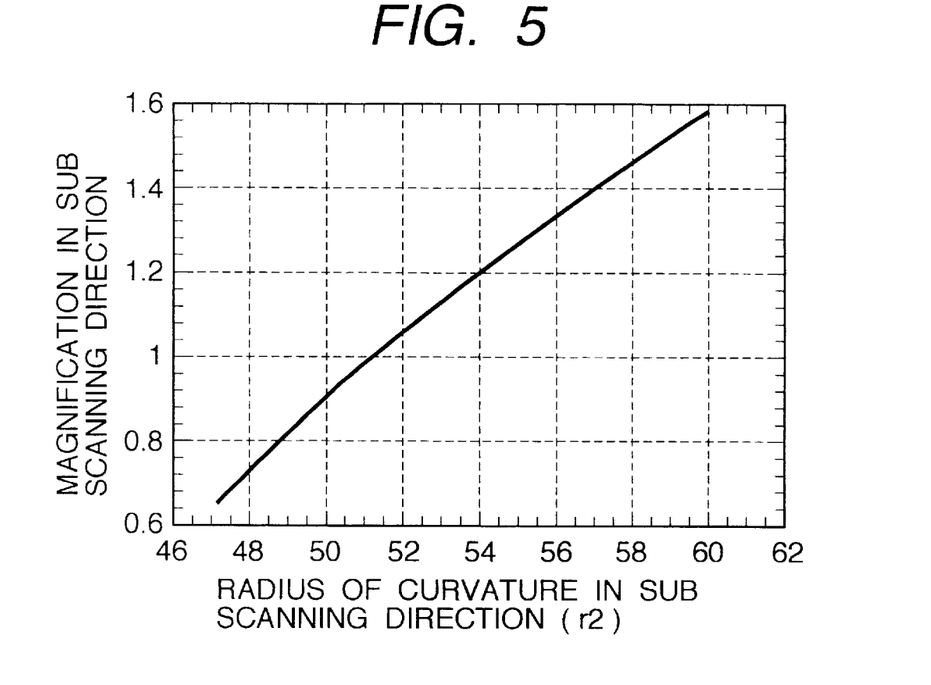
FIG. 5 is a diagram illustrative of a relationship between a magnification in the sub scanning direction and the radius of curvature r2 in the sub scanning direction.

A sectional view of this optical system as viewed in the sub scanning direction is shown in FIG. 3. In the conventional example, an image is formed on the photoreceptor 8 by appropriately combining a radius of curvature r1 in the sub scanning direction (a radius of curvature in the sub scanning direction of the aspherical lens) and a radius of curvature r2 in the sub scanning direction (a radius of curvature in the sub scanning direction of the cylinder lens). The relationship between r1 and r2 in this case is as shown in FIG. 4. That is, the combinations shown in FIG. 4 would allow an image to be formed on the photoreceptor 8. For such combinations, r2 is related to the magnification in the sub scanning direction as shown in FIG. 5. Thus, r2 is selected so that a desired magnification in the sub scanning direction can be obtained, and r1 is thereafter calculated from r2. It can generally be said that the smaller the magnification, the lower the sensitivity of an optical system. Therefore, the optical system becomes stable and easy to assemble and adjust. Hence, the magnification has heretofore been set to a low value.

Figure 6:
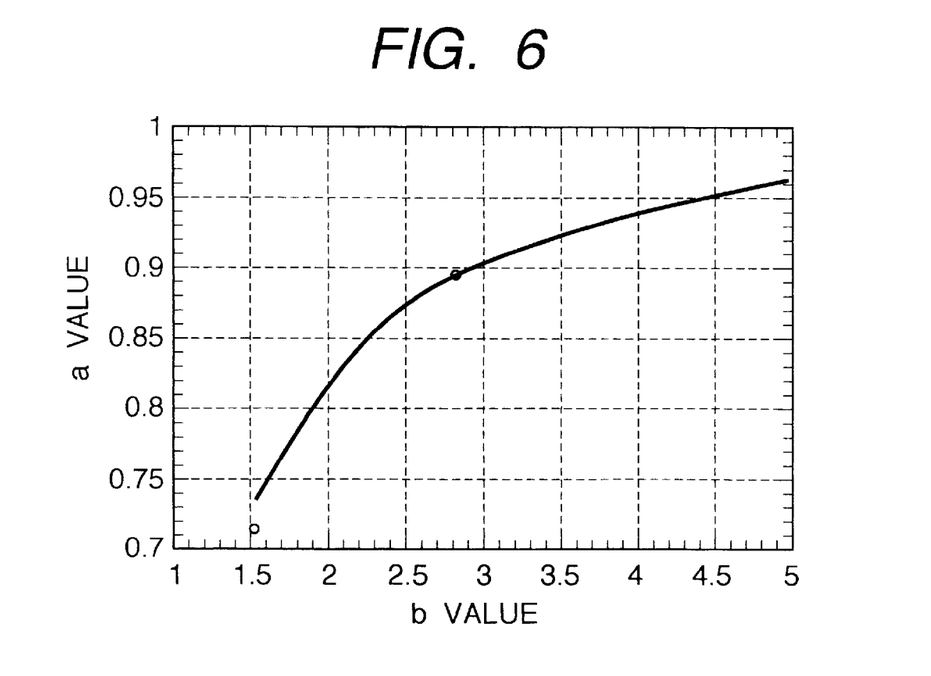
FIG. 6 is a diagram illustrative of a relationship between value a and value b.

On the other hand, if it is assumed that a magnification in the sub scanning direction at the central region of scanning is b and that a ratio of the magnification in the sub scanning direction at the central region of scanning b to a magnification in the sub scanning direction at the peripheral region of scanning b' is a (=b/b'), then the relationship between a and b is as shown in FIG. 6. That is, the smaller the magnification b, the larger the difference between the magnification at the central region and that at the peripheral region with the ratio a becoming smaller than 1. As a result, in one-beam scanning, it happens that the spot diameter becomes smaller toward the peripheral region. However, this phenomenon brings about few conspicuous change in the prints actually made by one-beam scanning. Therefore, this phenomenon has been left unattended.

However, if a plurality of beams are used as the light source under this condition, scanning lines are curved at the peripheral region as shown in FIG. 2 since the beam path itself is curved. Therefore, print pitch error occurs at the peripheral region, which has been a problem.

SUMMARY OF THE INVENTION

The present invention has been made in view of the above problems with the prior art, and therefore an object of the invention is to implement an optical system that allows a minimum magnification in the sub scanning direction to be obtained under the condition that print pitch error is controlled within an allowable range even at the peripheral region of printing in the case where the optical system is of a type using a plurality of beams and has an Fθ lens system that consists of a plurality of lenses including at least a single cylinder lens.

To achieve the above object, the invention is applied to a multi-beam optical scanning system comprising: a light source for generating a plurality of laser beams; a collimator lens for condensing the plurality of beams; an optical beam injecting optical system for injecting the collimated beams onto a rotary polygon mirror; the rotary polygon mirror; and an Fθ lens system having a plurality of lenses for allowing light deflected and scanned by the rotary polygon mirror to form an image at a predetermined place, the Fθ lens system including at least a single cylinder lens. In such a multi-beam optical scanning system, equation (1) is satisfied when the number of beams (N) is 2 or 3.

$$0.8 \leq \{2N-(N-1)a\}/(N+a) \leq 1.2 \tag{1}$$

Further, equation (2) is satisfied when the number of beams (N) is 4 or more.

$$0.8 \leq \{N-a(N-3)\}/3a \leq 1.2 \tag{2}$$

where a is the ratio of a magnification at a central region of scanning in an sub scanning direction to a magnification at a peripheral region of scanning in the sub scanning direction.

The above and other objects and features of the present invention will be more apparent from the following description taken in conjunction with the accompanying drawings.

DETAILED DESCRIPTION OF THE PREFERRED EMBODIMENTS

According to a multi-beam scanning optical system of the invention, even if an Fθ lens system consisting of a plurality of lenses including at least a single cylinder lens is used, not only the magnification of the optical system can be reduced and the difference between a magnification at the peripheral region and a magnification at the central region can be reduced, but also an optical scanning system in which scanning pitch error is limited to an allowable range can be implemented by setting to appropriate values a radius of curvature r1 in an sub scanning direction of a lens constituting the Fθ lens system and a radius of curvature r2 in the sub scanning direction of the cylinder lens. The following describes such an optical scanning system in detail.

Figure 7:
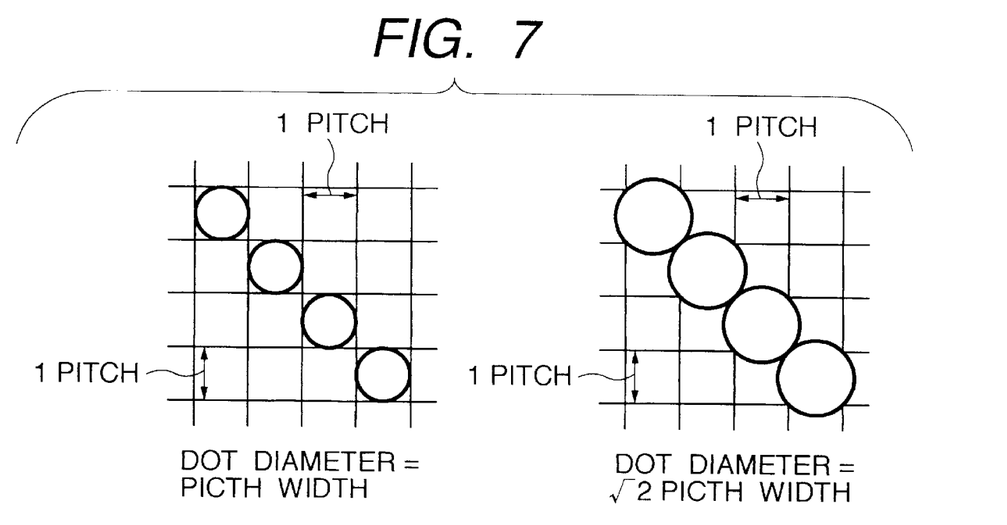
FIG. 7 is a diagram illustrative of the diameter of a printed dot and a print pitch.

First, let us consider print pitch. It is generally said that a satisfactory spot diameter of an optically scanning beam is about √2 times the print pitch. The reason therefor is to make a print of a continuous oblique line such as shown in FIG. 7 with single dots. That is, as shown in the left side of FIG. 7, if the diameter of a dot is equal to the print pitch, the oblique line is broken, not continuous, which is a problem. Therefore, as shown in the right side of FIG. 7, the diameter of a dot is set to about √2 times the print pitch.

Figure 8:
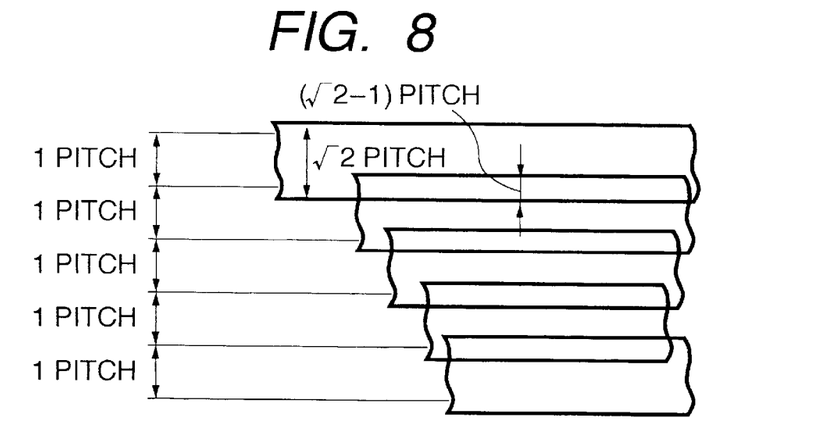
FIG. 8 is a diagram illustrative of scanning at the time of making a solid black print

On the other hand, if a horizontal line is printed over another horizontal line, i.e., if a solid black print is to be made with the beam spot diameter set to √2 times the print pitch, optical scanning operation is performed with the beam spot diameter √2 times the single print pitch as shown in FIG. 8. As a result, the scans overlap at a (√2−1) pitch. In this case, even if a scanning line is curved, as long as the size of the curve is within (√2−1) pitch, such curve does not affect the printing. That is, even if there is a scanning pitch error of about 1:√2, no problem arises from this print pattern. Thus, scanning pitch error will not be discussed for this print pattern.

Figure 9:
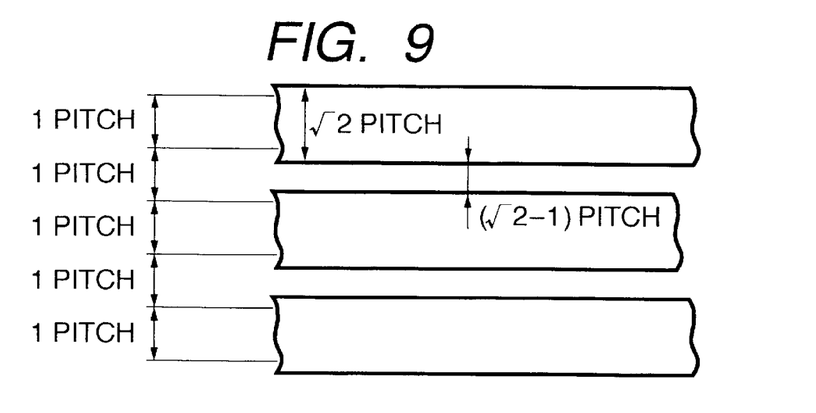
FIG. 9 is a diagram illustrative of the case of printing every other line.

Further, in the case where horizontal lines are printed every other line as shown in FIG. 9, the width of a nonprinted region is (√2−1) with respect to a print line width √2. Therefore, the ratio of the printed region to the nonprinted region is about 1:0.3. In such a case, even if such horizontal lines are printed by an electrophotographically developing method, the horizontal lines are hard to resolve from each other. As a result, these horizontal lines appear to be printed solid in the entire printed region. Thus, the scanning pitch error will not be discussed for this print pattern, either.

The foregoing indicates that print pitch error will be discussed for print patterns in which only one horizontal line is printed and n horizontal lines are not printed (n≧2).

Let us then consider a magnification in the sub scanning direction b at the central print region and the ratio a of b to a magnification in the sub scanning direction at the peripheral print region. It is preferred that the magnification b at the central print region be set to a small value, because not only freedom in designing the entire part of the Fθ lens system can be increased, but also the assembling and adjusting of the Fθ lens system can be facilitated. However, in the three-lens type Fθ lens system consisting of a spherical lens, a aspherical lens, and a cylinder lens, a small magnification b at the central region makes the magnification ratio a away from 1. The invention is characterized as setting the radius of curvature r1 in the sub scanning direction of the aspherical lens and the radius of curvature r2 in the sub scanning direction of the cylinder lens so that not only the magnification ratio can be within an allowable range but also the magnification can be minimized.

Then, the allowable range of the magnification ratio a will be discussed according to the number of beams.

Figure 10:
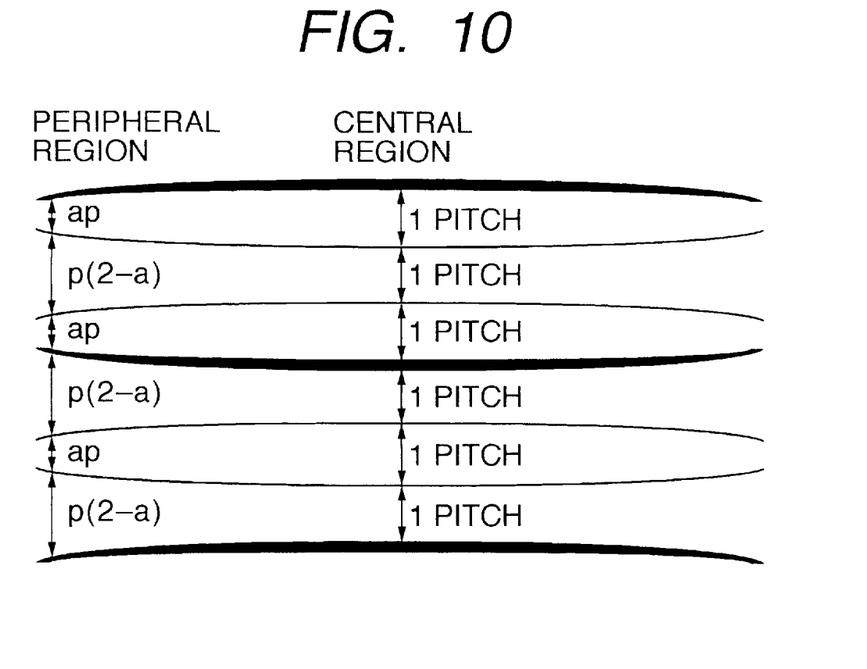
FIG. 10 is a diagram illustrative of a scanning condition.

First, cases of two-beam printing will be considered. If the number of beams employed in printing is 2, a print pattern that exhibits the most conspicuous print pitch error is such that the operation of printing only one horizontal line and thereafter leaving a space for two lines nonprinted is repeated. The state of the scannint pitch in this situation is shown in FIG. 10. A print pattern including a nonprinted space for three lines or more has a larger space between printed lines, and this makes the pitch error less conspicuous. Thus, if the pitch error is not conspicuous in the case where a print pattern including a nonprinted space for two lines is printed, it can be said that the pitch error is not conspicuous in any print patterns in two-beam printing. Assuming that the print pitch at the central print region is p and that the ratio of the magnification at the central region to the magnification at the peripheral region is a as shown in FIG. 10, then the minimum pitch W1 at the peripheral region with this print pattern can be expressed as equation (3).

$$W1 = ap + p(2-a) + ap = p(2+a) \tag{3}$$

Further, the maximum pitch W2 is given as equation (4).

$$W2 = p(2-a) + ap + p(2-a) = p(4-a) \tag{4}$$

Thus, the pitch error ratio Q can be expressed as equation (5).

$$Q = W2/W1 = (4-a)/(2+a) \tag{5}$$

That is, it can be said that the pitch error in this pattern is not conspicuous as long as Q is within the allowable range.

Figure 11:
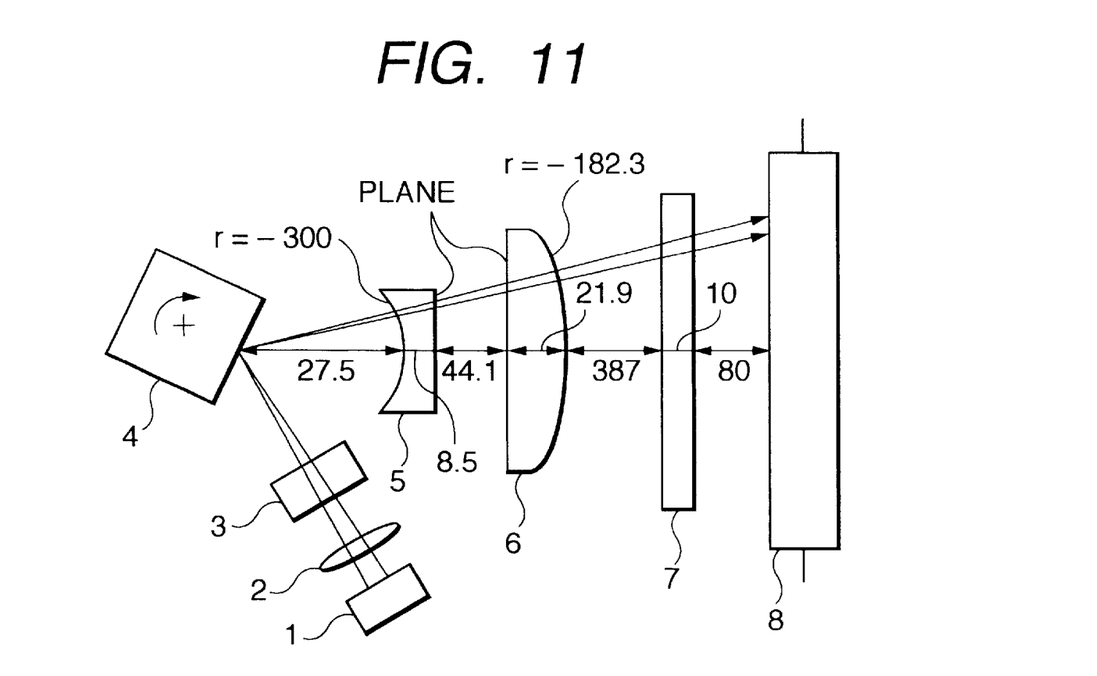
FIG. 11 is a diagram showing a general configuration of a specific example of the invention.
Figure 12:
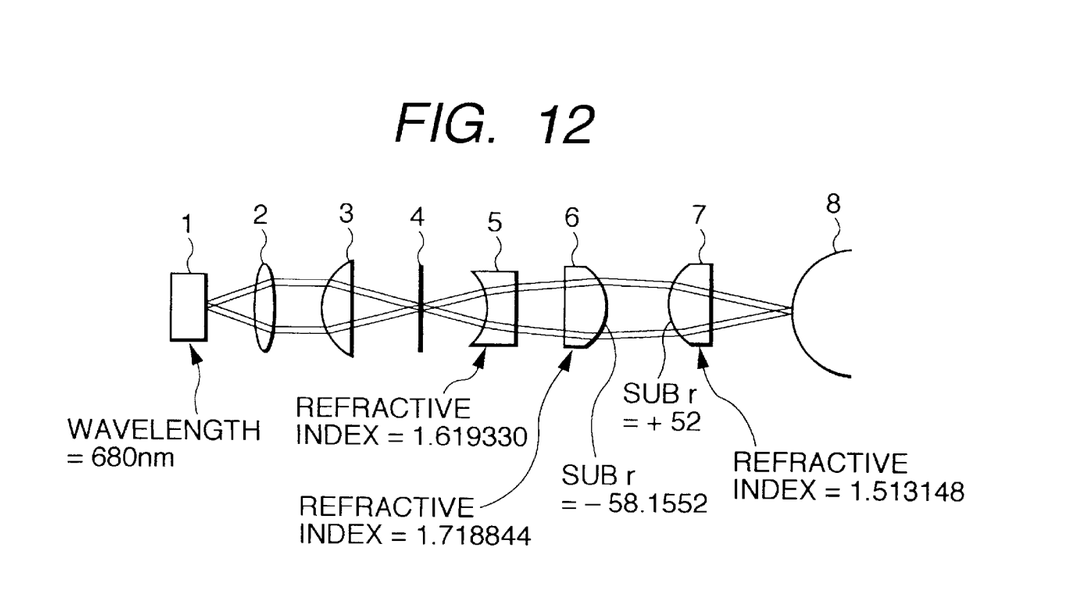
FIG. 12 is a diagram showing a general configuration of a specific example of the invention.

Although it depends on individuals, it has been found that this range becomes inconspicuous when the range is between 0.8 and 1.2. An Fθ lens system such as shown in FIGS. 11 and 12 is proposed as an example that satisfies the above condition. FIG. 11 is a plan view; and FIG. 12 is a side view. In this case, r1 is set to −58.1552 mm; and r2 to 52 mm. Calculating the magnification in the sub scanning direction at the central region, b=1.5135 x. Further, the magnification ratio a of b to the magnification at the peripheral region equals 0.7335. If a=0.7335 is substituted for equation (5), the pitch error ratio Q equals 1.1950, which means that Q is within the allowable range that is between 0.8 and 1.2. As a result, the pitch error is inconspicuous, which in turn not only allows satisfactory printing to be implemented, but also allows the magnifications to be reduced.

Figure 13:
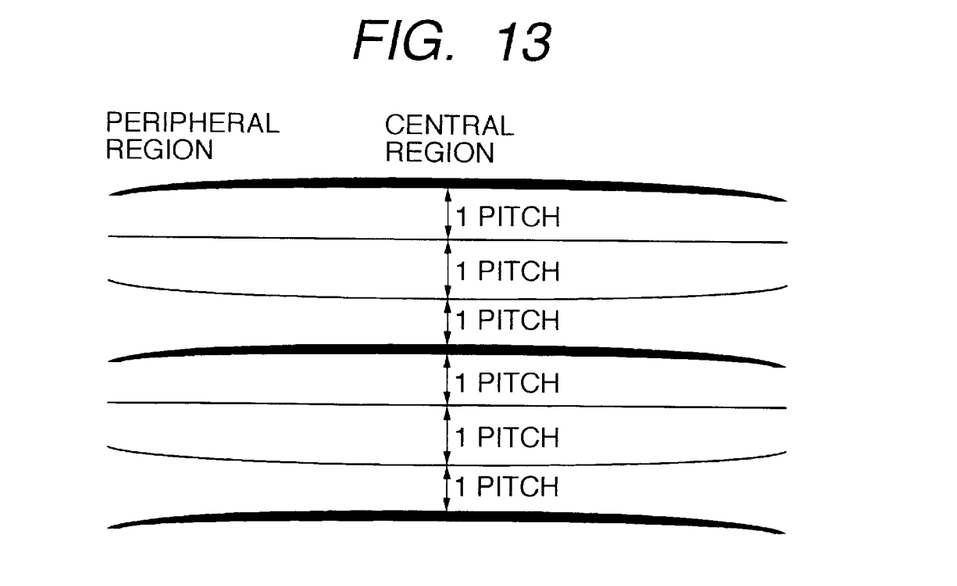
FIG. 13 is a diagram illustrative of a scanning condition.
Figure 14:
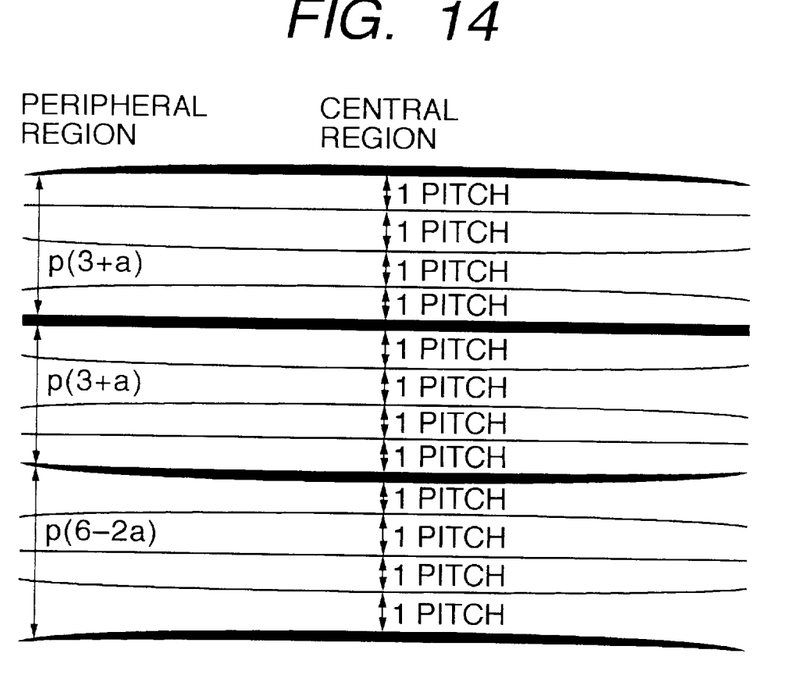
FIG. 14 is a diagram illustrative of a scanning condition.

Secondly, let us consider cases of three-beam printing. Likewise in two-beam printing, such a print pattern that the operation of printing only one horizontal line and thereafter leaving a space for two lines nonprinted is repeated will be considered for three-beam printing. As shown in FIG. 13, slender lines indicate where to scan but not print, whereas thick lines indicate where to print. In this case, the same beams are used to print each line, and therefore no pitch error occurs. Thus, in three-beam scanning, a print pattern that exhibits the most conspicuous print pitch error is such as shown in FIG. 14; i.e., the print pattern is such that the operation of printing only one horizontal line and thereafter leaving a space for three lines nonprinted is repeated.

Therefore, if there occurs no pitch error in this print pattern, it can be said that three-beam scanning is free from print pitch error. The minimum pitch W1 in this case can be expressed as equation (6).

$$W1 = ap + ap + p(3-2a) + ap = p(3+a) \quad (6)$$

Further, the maximum pitch W2 is given as equation (7).

$$W2 = p(3-2a) + ap + ap + p(3-2a) = p(6-2a) \quad (7)$$

Thus, the pitch error ratio Q can be expressed as equation (8).

$$Q = W2/W1 = (6-2a)/(3+a) \quad (8)$$

Figure 15:
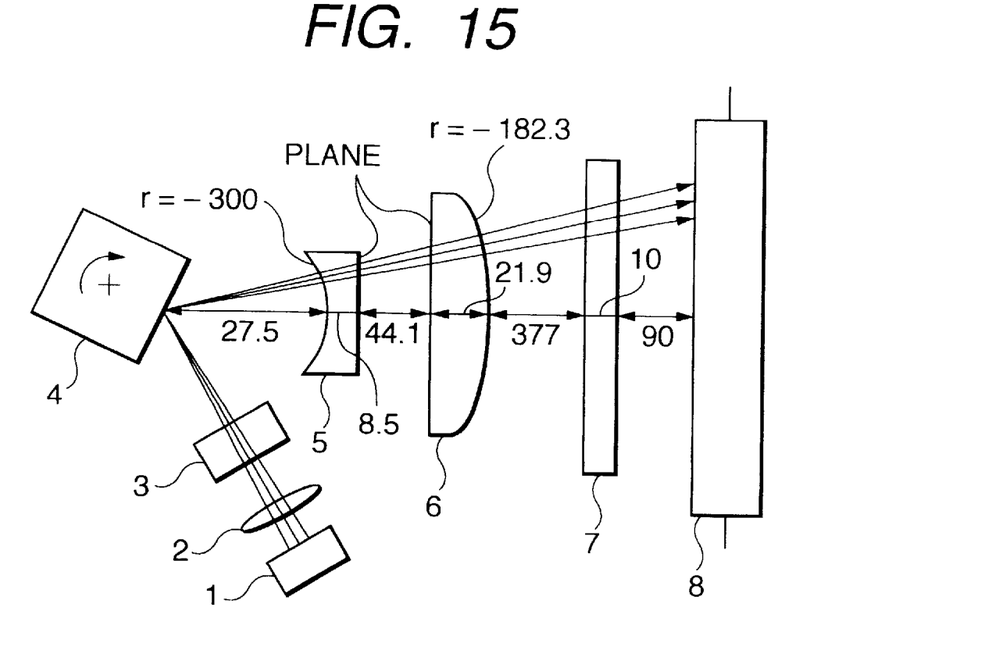
FIG. 15 is a diagram showing a general configuration of a specific example of the invention.
Figure 16:
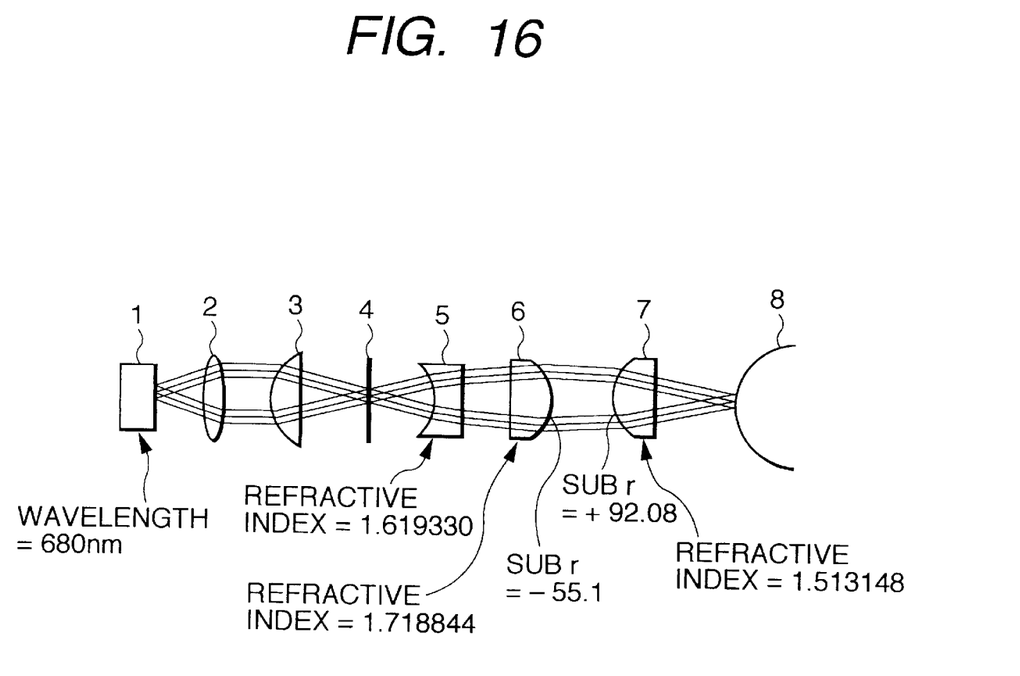
FIG. 16 is a diagram showing a general configuration of a specific example of the invention.

That is, it can be said that the pitch error for this pattern is not conspicuous as long as Q is within the allowable range, which is between 0.8 and 1.2. An Fθ lens system such as shown in FIGS. 15 and 16 is proposed as an example that satisfies the above condition. In this case, r1=−55.1 mm; and r2=92.08 mm. The magnification in the sub scanning direction at the central region equals 2.8476 x, and the magnification ratio a of b to the magnification at the peripheral region equals 0.8932.

If a=0.8932 is substituted for equation (8), the pitch error ratio Q equals 1.082, which is between 0.8 and 1.2. As a result, the pitch error is inconspicuous. Thus, not only satisfactory printing can be implemented, but also the magnifications can be reduced.

Here, let us merge equation (5) and equation (8) into one. Assuming that the number of beams is N, the pitch error ratio Q can be expressed as equation (9) when N equals 2 or 3.

$$Q = \{2N = (N-1)a\}/(N+a) \quad (9)$$

Thus, as long as Q in equation (9) is between 0.8 and 1.2 when N=2 or 3, then it can be said that satisfactory printing can be implemented.

Thirdly, let us consider cases of four-beam printing or of printing with more than four beams. It is assumed that the number of beams that is equal to or greater than four is N. A print pattern that exhibits the most conspicuous print pitch error in this case is such that the operation of printing only one horizontal line and thereafter leaving a space for two lines nonprinted is repeated. The aforementioned considerations are similarly given to this print pattern, the pitch error ratio Q under N-beam scanning can be expressed as equation (10).

$$Q = \{N - a(N-3)\}/3a \quad (10)$$

If Q is within the pitch error allowable range, which is between 0.8 and 1.2, then the pitch error in this print pattern is inconspicuous. Since other patterns are subject to less stringent conditions than this, satisfactory printing can be implemented for all print patterns under printing with four or more beams.

While the cases where an Fθ lens system consists of a plurality of lenses including a single spherical lens, a single aspherical lens, and a single cylinder lens have been described in the aforementioned examples, it is apparent that the invention is similarly applicable to other Fθ lens designs. Therefore, descriptions as to cases where the invention is applied to such other designs will be omitted.

The invention is characterized as setting the radius of curvature r1 in the sub scanning direction of the aspherical lens and the radius of curvature r2 in the sub scanning direction of the cylinder lens to appropriate values in an Fθ lens system including at least a single cylinder lens. As a result of this design, not only the ratio of a magnification at the central region to that at the peripheral region can be set to a small value that is not more than necessary, but also the magnification at the central region can be set to a small value. Hence, the invention can provide an Fθ lens system that is free from print pitch error during multi-beam scanning and that is easy to assemble and adjust.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A multi-beam optical scanning system, comprising:
   a light source for generating a plurality of laser beams;
   a collimator lens for condensing the plurality of laser beams;
   a rotary polygon mirror;
   an optical beam injecting optical system for injecting the collimated beams onto said rotary polygon mirror; and
   an Fθ lens system having a plurality of lenses for allowing light deflected and scanned by the rotary polygon mirror to form an image at a predetermined place, said Fθ lens system including at least a single cylinder lens;
   wherein said optical scanning system satisfies the following equation when the number of beams (N) is 2 or 3;

$$0.8 \leq \{2N-(N-1)a\}/(N+a) \leq 1.2$$

where a is the ratio of a magnification at a central region of scanning in an sub scanning direction to a magnification at a peripheral region of scanning in the sub scanning direction.

2. A multi-beam optical scanning system, comprising:
   a light source for generating a plurality of laser beams;
   a collimator lens for converging the plurality of laser beams;
   a rotary polygon mirror;
   an optical beam injecting optical system for allowing the collimated beams onto said rotary polygon mirror; and
   an Fθ lens system having a plurality of lenses for allowing light deflected and scanned by said rotary polygon mirror to form an image at a predetermined place, said Fθ lens system including at least a single cylinder lens;
wherein said optical scanning system satisfies the following equation when the number of beams (N) is 4 or more;

$$0.8 \leq \{N-a\,(N-3)\}/3a \leq 1.2$$

where a is the ratio of a magnification at a central region of scanning in an sub scanning direction to a magnification at a peripheral region of scanning in the sub scanning direction.

* * * * *